S. Vreeland,
Bee-Hive.
No. 92,913.      Patented Jul. 20, 1869.
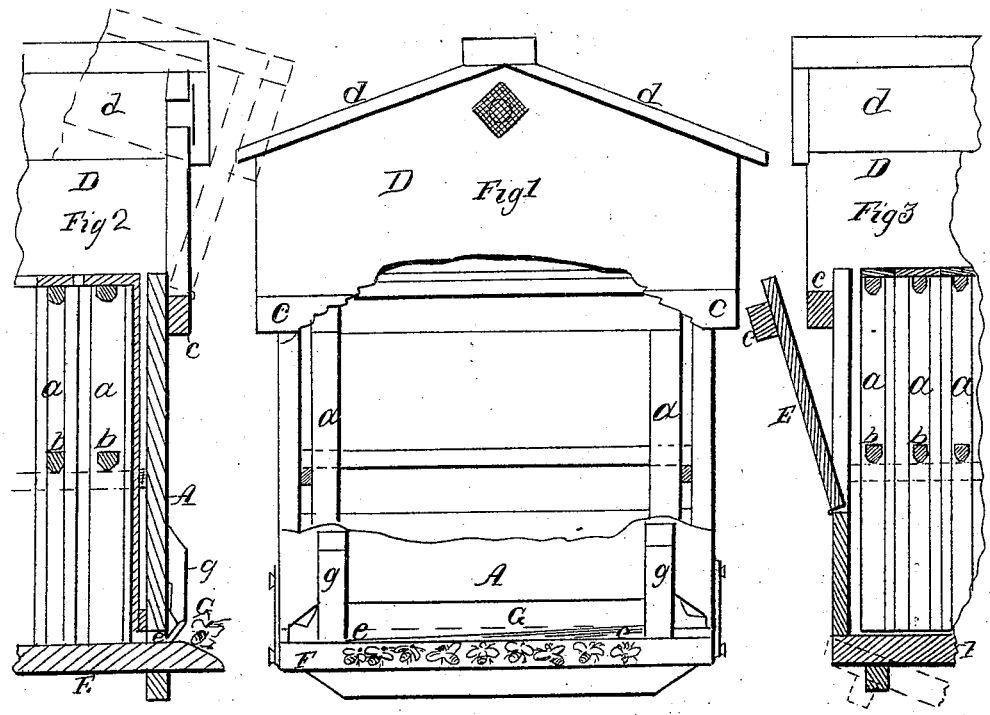
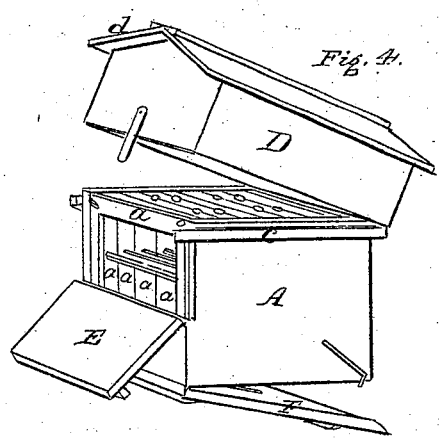
Witnesses
Isle C. Green
Chas H. Pool
Inventor
Simon Vreeland
By J. B. Woodruff & Son Attys

United States Patent Office.

SIMON VREELAND, OF CUBA, NEW YORK.

*Letters Patent No. 92,913, dated July 20, 1869.*

IMPROVEMENT IN BEE-HIVES.

The Schedule referred to in these Letters Patent and making part of the same.

*To all whom it may concern:*

Be it known that I, SIMON VREELAND, of Cuba, in the county of Allegany, and State of New York, have invented certain new and useful Improvements in the Construction of Bee-Hives; and the following is a full, clear, and exact description of the same, reference being had to the accompanying drawings, making a part of this specification, in which—

Figure 1 represents a front view, showing the metal-spring sliding shutter, to close the entrance; also, a broken-out section, to show the comb-racks.

Figure 2 shows a broken-off sectional side view of the hive; with the bottom board closed; the top partially raised from the rear side, in dotted lines.

Figure 3 shows a rear-side view of the same; back of the hive partly open; the bottom board partly let down, in dotted lines; the edge view of the comb-racks.

Figure 4 represents, in perspective, the whole of the hive. The upper portion partly raised, showing the openings in the top of the comb-racks, to admit the bees to the honey-boxes, when placed over them; the rear trap-door or shutter let down, to show the interior arrangement of the comb-racks; the bottom board also depressed.

The objects of my improvements are several. One of them is, to prevent the weaker swarms or colonies from being robbed by the stronger, and also to prevent the bee-moth or miller from entering at night. Likewise, thoroughly ventilating the bees in hot weather, and protecting the colony from the extreme cold in the winter. Also, providing a more convenient mode of placing boxes for honey, and removing them when filled, as well as for watching their progress in their work.

My invention consists in the construction of the series of comb-frames, and supporting them on the projecting ends of the middle bars, so that when a sufficient number of them is put together, and clamped by hook-rods, they form an internal box, for the colony of the bees to breed and live in, there being a space for the circulation of air between the rack-box and the outside of the lower story or portion of the hive, so that neither extreme heat nor cold can come in contact with the inner case that contains the colony.

The comb-racks, being supported on the projecting ends of the middle bars, on cleats secured to the inside of the outer case, admit of the top being raised, or the bottom let down, without in the least disturbing anything, and when central or parallel bars are placed under others, the bees will leave many openings and passages between the top and bottom sections of the comb, so that they have a shorter way for circulating all through the hive; and, moreover, the interior is ventilated, so that the heat in the centre can escape, and the temperature be very nearly equalized.

To enable others to make and use my improvements in the construction of bee-hives, I will proceed to describe them more in detail, referring to the several figures in the drawings, and to the letters of reference marked thereon.

The same letters indicate the like parts in all of the figures.

I make my improved bee-hives of good planed lumber, of a suitable or any required size.

The box A, that forms the lower story, or the portion in which the comb-frames *a a a a* are suspended on the ends of the bars *b b b*, I make about square, the width and height equal.

Around, near the top, I attach cleats *c c*, on which the upper story D or portion of the hive rests, when it is closed down in its place, the top being finished with a double angular roof, *d d*, with the ends and edges projecting over a sufficient distance to give them a symmetrical architectural appearance.

The back or rear side of the box A, being provided with a trap or fall-door, E, hinged at the bottom, so that when the top D is raised a little, it can be let down, so as to inspect the colony, and see if the comb on the outside contains honey.

The bottom F is also hinged to the rear side of the box A, so that it can be let down, to look into the colony, or remove any extraneous matter that may be lodged upon it.

The central portion of the bottom F is provided with an opening-screen and shutter, so that a sufficient circulvtion of air may be kept up when the entrance *e e* is closed up by the sliding spring-shutter G, or the opening in the bottom can be closed by the cover, to prevent the air from passing in, in the cold season.

The sliding shutter G, as seen in fig. 1, may be made of roll-brass or hoop-iron, or of strips of tough wood, sufficiently springy to hold itself in any position it may be placed, and is secured to the box A by blocks *z z*, so that it will slide up, to give the opening or entrance *e e* its fullest capacity, or it can be placed angle-ways, so that but one end will admit the bees to crawl under it, to pass in or out, or it may entirely close the opening, which should be done at night, to prevent the bee-moth or worm-miller from entering to deposit its eggs, which is always done when the bees are still.

When it is discovered that a swarm or colony has been attacked by robbers, the slide G should be raised at one end only, leaving a sufficient space for the bees which belong to that hive to crawl out and in, for it is an established fact, that if foreign bees come to rob, they do not alight until they have passed the sentinels, which are always placed to guard the entire entrance, and if they cannot get within the hive while on the wing, they will be attacked by such numbers that but few can escape. The slide G being set, (under such circumstances,) as seen in fig. 1, not one robber bee in ten can successfully enter or escape, and soon the robbers cease to attempt to commit their depredations.

The advantages of my improvements, as above described, will be readily seen and understood by all keepers of "apiaries," and by their adoption a large increase of profits from keeping bees may be obtained.

What I claim as my invention, and desire to secure by Letters Patent, is—

The manner of supporting a series of comb-racks, $a\ a\ a$, on the projecting ends of the middle bars $b\ b$, so as to provide for the circulation of air between the outer and inner case, for the purposes herein described.

In testimony whereof, I hereunto subscribe my name, in the presence of—

SIMON VREELAND.

Witnesses:
    J. B. WOODRUFF,
    ROSWELL WAKEMAN.